(12) United States Patent
Andersson

(10) Patent No.: US 6,179,379 B1
(45) Date of Patent: Jan. 30, 2001

(54) SAFETY SEAT

(75) Inventor: Sture Andersson, Nacks (SE)

(73) Assignee: Autoliv Development AB, Vårgårda (SE)

( * ) Notice: Under 35 U.S.C. 154(b), the term of this patent shall be extended for 0 days.

(21) Appl. No.: 09/254,397

(22) PCT Filed: Sep. 4, 1997

(86) PCT No.: PCT/SE97/01473

§ 371 Date: Oct. 22, 1999

§ 102(e) Date: Oct. 22, 1999

(87) PCT Pub. No.: WO98/09836

PCT Pub. Date: Mar. 12, 1998

(30) Foreign Application Priority Data

Sep. 6, 1996 (GB) .................................................. 9618671

(51) Int. Cl.⁷ .............................. B60N 2/42; B60R 21/00
(52) U.S. Cl. ................................ 297/216.13; 297/216.12
(58) Field of Search ....................... 297/216.13, 216.12, 297/216.14, 216.1

(56) References Cited

U.S. PATENT DOCUMENTS

| | | |
|---|---|---|
| 3,929,374 | 12/1975 | Hogan et al. . |
| 4,040,661 | 8/1977 | Hogan et al. . |
| 5,290,091 * | 3/1994 | Dellanno et al. ........... 297/216.12 X |
| 5,378,043 * | 1/1995 | Viano et al. ................. 297/216.12 X |
| 5,676,421 * | 10/1997 | Brodsky ........................... 297/216.13 |
| 5,746,467 * | 5/1998 | Jesadanont ................. 297/216.13 X |
| 5,772,280 * | 6/1998 | Massara ....................... 297/216.13 X |
| 5,823,619 * | 10/1998 | Heilig et al. ................. 297/216.13 X |
| 5,884,968 * | 3/1999 | Massara ........................... 297/216.12 |
| 5,927,804 * | 7/1999 | Cuevas ........................ 297/216.13 X |
| 5,934,750 * | 8/1999 | Fohl ................................ 297/216.12 |
| 6,019,424 * | 2/2000 | Ruckert et al. ............. 297/216.13 X |
| 6,022,074 * | 2/2000 | Swedenclef ................. 297/216.13 X |
| 6,024,406 * | 2/2000 | Charras et al. ............. 297/216.13 X |
| 6,033,017 * | 3/2000 | Elqedah et al. ............. 297/216.13 X |
| 6,033,018 * | 3/2000 | Fohl ................................ 297/216.13 |

FOREIGN PATENT DOCUMENTS

WO 95/11818   5/1995 (WO) .

* cited by examiner

Primary Examiner—Peter M. Cuomo
Assistant Examiner—Rodney B. White
(74) Attorney, Agent, or Firm—Venable; Robert Kinberg (57) ABSTRACT

A safety seat for use in a motor vehicle has a squab (101) and a back (104) and a head-rest (105). There is a pivotal connection between the back (104) and the squab (101). The head-rest (105) is mounted on a series of levers (112). If the vehicle is involved in a rear impact, the back (104) of the seat may move rearwardly. Simultaneously, because of the levers (112) the head-rest (105) will move forwardly relative to the back of the seat. Thus, the head-rest will come into contact with the head of the occupant of the seat, thus minimizing the risk of "whiplash" injuries.

13 Claims, 6 Drawing Sheets

SAFETY SEAT

BACKGROUND OF THE INVENTION

THE PRESENT INVENTION relates to a safety seat, and in particular, relates to a safety seat intended for use in a motor vehicle, such as a motor car.

It has been appreciated that if a motor vehicle, such as a motor car, is involved in a rear end collision, that is to say a following vehicle runs into the back of the car, the occupants of the struck car often suffer from neck injuries. Such injuries are commonly called "whiplash" injuries.

It is to be understood that during the rear-end collision of this type, the vehicle that is struck is subjected to a forward acceleration. This imparts a forward acceleration to the seats of the vehicle. The squab and back of each occupied seat engage the posterior and torso of the occupant of the seat and impart a substantial acceleration to the posterior and torso of the occupant. However, no corresponding acceleration is immediately imparted to the head of the occupant, as the head is not normally in contact with the seat, or with the head-rest that may be provided on the seat. The head is a part of the body that has substantial mass, and consequently the head has substantial inertia.

Preferably the movement of the head-rest has an upward component and a forward component relative to the back of the seat.

Conveniently the rearward movement occurs in two stages, the movement of the head-rest being associated with the first stage only of the two-stage movement.

Preferably the seat is provided with a recliner mechanism operable to selectively adjust the inclination of the back of the seat, the arrangement being such that the position of the head-rest relative to the back of the seat does not alter on actuation of the recliner mechanism.

Conveniently the head-rest is associated with a linkage, the linkage incorporating a component which remains fixed relative to the squab of the seat when the back of the seat effects the pivotal rearward movement when subjected to the substantial force.

Preferably the component is associated with the recliner mechanism and is adapted to move, together with the back of the seat, when the recliner mechanism is actuated.

According to another aspect of this invention there is provided a safety seat for use in a motor vehicle, the safety seat comprising a squab, a back associated with the squab and a head-rest associated with the back; the back being pivotally connected to support means for pivotal movement relative to the support means, between predetermined limits; the support means being pivotally connected to the squab to permit movement of Thus, whilst the posterior and torso of the occupant of the vehicle are accelerated forwardly as a result of the rear-end collision, the head of the occupant of the vehicle initially remains stationary. This may cause the neck initially to adopt an "S"-shaped configuration as the lower part of the neck moves forwardly, whilst remaining vertical, and the upper part of the neck remains in its initial position. Subsequently, the head begins to rotate and the neck then occupies a curved configuration. The head subsequently moves forwardly. Research has shown that "whiplash" injuries may occur when the neck changes from the "S"-shaped configuration to the curved configuration, at a substantial speed.

SUMMARY OF THE INVENTION

The present invention seeks to provide an improved vehicle seat in which the relative "whiplash" injuries occurring to the occupant of the seat during a rear-end collision are reduced.

According to one aspect of this invention there is provided a safety seat for use in a motor vehicle, the safety seat comprising a squab, and a back associated with the squab and a head-rest associated with or formed integrally with the back, there being a pivotal connection between the back and the squab, the pivotal connection being such that the back will move pivotally rearwardly relative to the squab when subjected to a substantial force, means being provided associated with the head-rest adapted to move the head-rest with a movement that has at least a forward component relative to the back of the seat during at least part of the said rearward movement of the back-rest of the seat. the support means, and the back, relative to the squab, energy-absorbing means being provided to absorb energy when the support means pivot relative to the squab of the seat, there being a linkage between the head-rest and the support means, the arrangement being such that the head-rest will be caused to pivot forwardly, relative to the back of the seat, when the back of the seat executes a pivoting motion relative to the support means, but the head-rest will remain in a substantially fixed position, relative to the back of the seat, when the support means, together with the back, pivot relative to the squab.

Preferably the support means comprise at least one support plate provided on one side of the seat, the support plate being pivotally connected to the squab of the seat and the support plate being pivotally connected to an element associated with the back of the seat, the support plate carrying stop means adapted to engage the element to limit pivotal movement of the element relative to the support plate both forwardly and rearwardly.

Conveniently spring means are provided connected between the support means and the back of the seat to resist rearward pivotal movement of the back of the seat relative to the support plate.

Advantageously the energy-absorbing means comprise a yieldable element located between the support means and a stop.

Conveniently when a force is applied to the seat back the seat back may execute a first movement, moving pivotally relative to the support means, against a relatively low resisting force, and a second subsequent movement, with the support means moving pivotally relative to the squab, against a relatively high resisting force.

Preferably the head-rest is carried by at least one support arm, the support arm being associated with pivot means which mount the support arm to the back of the seat and each support arm having projecting means, projecting from the pivotal connection, the projecting means being associated with a link arm extending to the support means.

Advantageously means are provided which resist any tendency of the back of the seat to pivot forwardly from a rearward position with a pivoting movement relative to the support means.

Conveniently the resisting means comprise a hydraulic damper.

BRIEF DESCRIPTION OF THE DRAWINGS

In order that the invention may be more readily understood, and so that further features thereof may be appreciated, the invention will now be described, by way of example, with reference to the accompanying drawings in which.

DETAILED DESCRIPTION OF THE INVENTION

Figure 1:
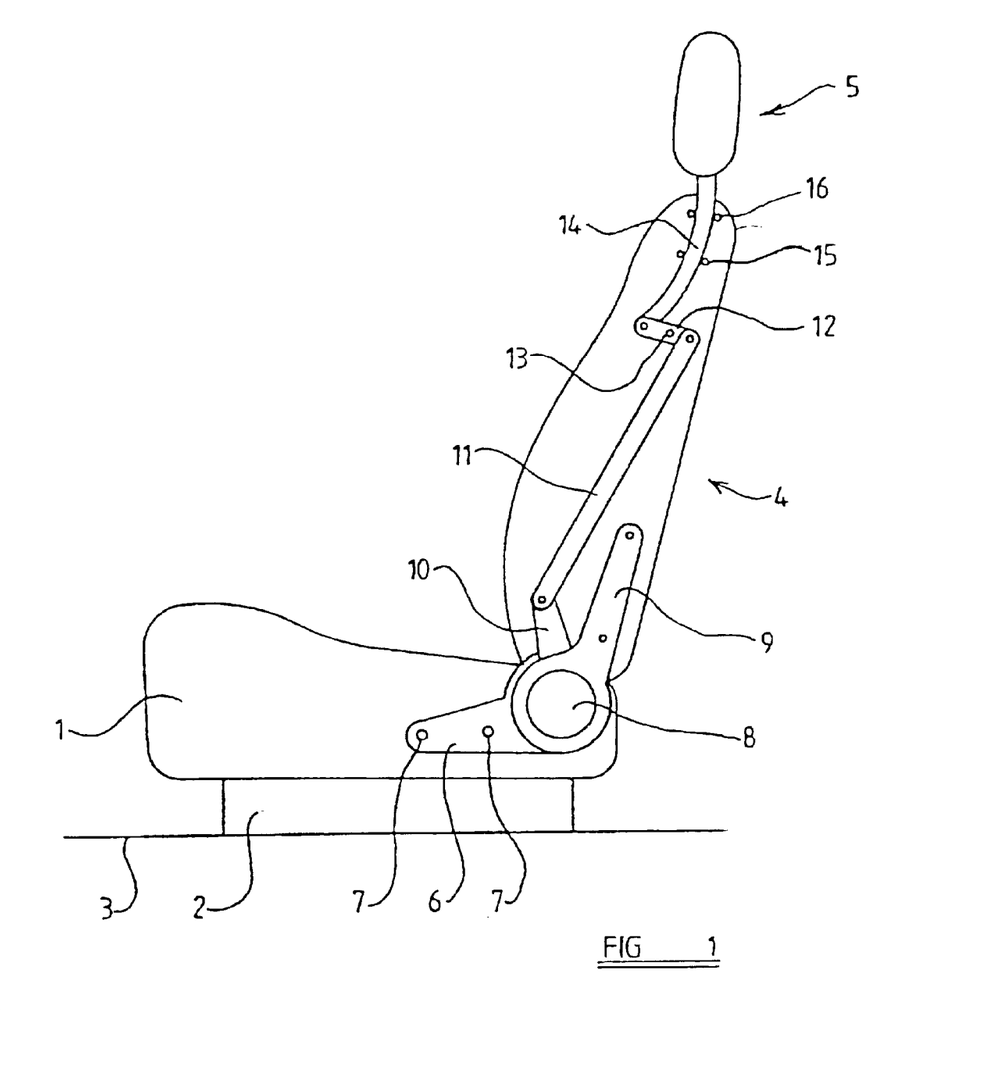
FIG. 1 is a diagrammatic side view of a seat in accordance with the invention in an initial condition.
Figure 2:
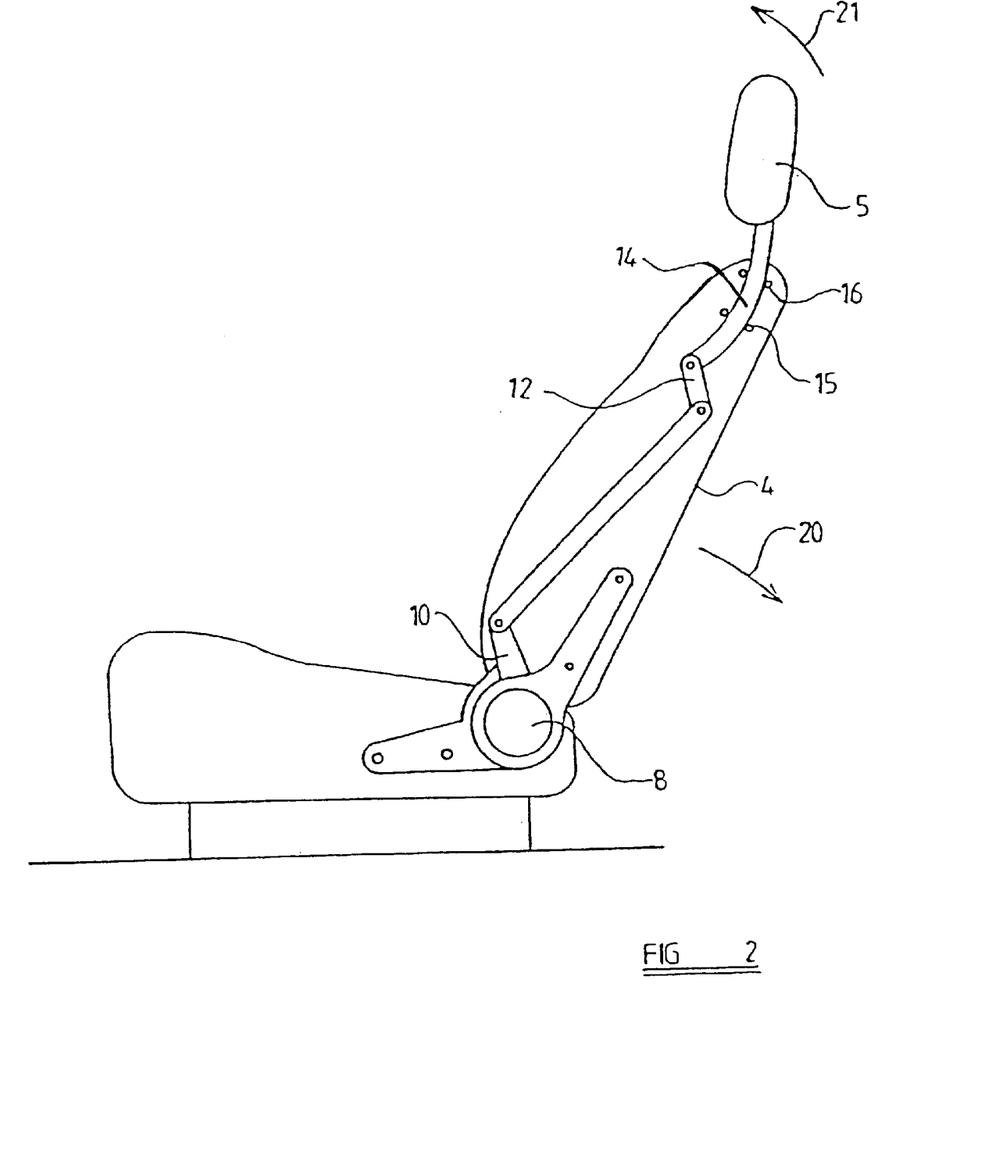
FIG. 2 is a view corresponding to FIG. 1 showing the seat in a second condition.

Referring initially to FIGS. 1 and 2 of the accompanying drawings, a safety seat for use in a motor vehicle, such as a motor car is illustrated. The seat comprises a squab 1 which is mounted on a support 2 which is carried by the floor 3 of the motor vehicle. A seat-back 4 is provided which is associated with the squab 1. A head-rest 5 is provided at the top part of the back 4, in a conventional position. The head-rest 5 may be formed integrally with the seat-back 4 and may thus be contained, together with the seat-back 4, within a single upholstering, or may have its own upholstering as illustrated in the figures. In either case the head-rest may be said to be "associated" with the seat-back.

The squab 1 is associated with two support plates 6, only one of which is shown here. The support plates are mounted symmetrically on either side of the squab. Each support plate 6 is of generally triangular form. The support plate is secured to the squab by means of two securing means 7. The support plate supports a recliner mechanism 8 which has an arm 9 secured to the back 4 of the seat. The recliner mechanism 8 may be activated, by means of a knob, to enable the occupant of the seat to alter the angle of inclination of the back 4 of the seat relative to the squab 1. When the recliner mechanism is activated, the position of the arm 9 relative to the plate 6 is altered.

A first link arm 10 is provided which is connected to the recliner mechanism. The link arm 10 is connected to the recliner mechanism in such a way that on ordinary use of the recliner mechanism the link arm 10 will move in synchronism with the back 4 of the seat. However, the recliner mechanism a incorporates a mechanism which permits the back 4 of the seat to pivot rearwardly without the recliner mechanism being manually operated in the event that substantial force is applied to the back 4 of the seat.

A substantial force may be applied to the back of the seat 4 by the occupant of the seat in the event that a rear impact occurs. If a rear impact does occur, the squab 1 and back 4 of the seat may be accelerated forwardly relatively rapidly. Due to the inertia of the body of the occupant of the seat, the back of the occupant of the seat will apply a substantial force, in a generally rearward direction, to the back of the seat. In such a situation, the back of the seat will pivot rearwardly about the axis defined by the recliner mechanism 8. However, the first link arm 10 will remain in a stationary position relative to the squab of the seat during this particularly rearward movement of the back of the seat.

The first link arm 10 is connected by means of an elongate second link element 11 to a transverse lever 12 which is pivotally mounted on the seat back 4 for pivotal movement about its centre point 13. The other end of the lever 12 is connected to an elongate arcuate support element 14 which engages with two pairs of guiding rollers 15,16 which are mounted on the seat back 4. The support element 14 supports at its upper end, the head-rest 5.

It is to be appreciated that in the event a rear impact should occur, the seat will enter the condition shown in FIG. 2. As can be seen, the seat-back 4 has moved rearwardly, as indicated by the arrow 20, with a pivoting motion about the axis defined by the recliner mechanism 8. The first link arm 10 has remained stationary, whilst the back 4 has moved rearwardly. Consequently, the lever 12 has pivoted about its centre point 13 forcing the upper end of the support 14 upwardly. Because of the arcuate nature of the support arm 14 and the position of the guiding rollers 15,16, the head-rest 5 has executed a movement relative to the seat back, as indicated by the arrow 21 which includes a forward component relative to the seat back and additionally an upward component relative to the seat back.

It is to be understood that the seat back 4 may execute a further rearward notion if the rear impact is a severe rear impact, with the further rearward motion again being a pivotal motion about the axis defined by the recliner mechanism 8. During this further rearward pivotal motion, the first link arm 10 will move together with the seat back 4, and consequently the head-rest 5 will not effect any further movement relative to the seat back.

Figure 3:
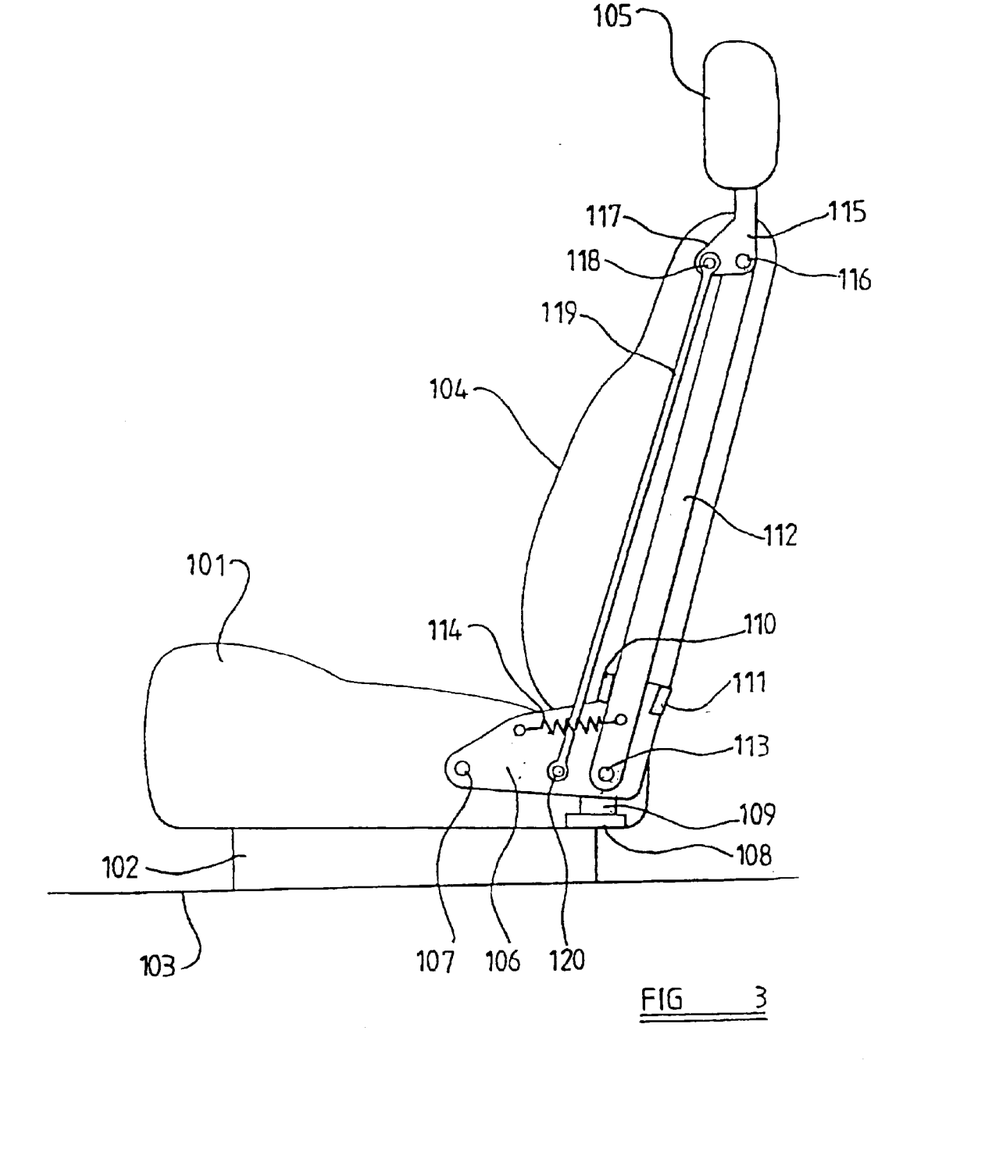
FIG. 3 is a diagrammatic side view of a seat in accordance with another embodiment of the invention in an initial condition.

Referring now to FIG. 3, a safety-seat for use in a motor vehicle such as a motor car is illustrated. The seat comprises a squab 101 which is mounted on a support 102 which is carried by the floor 103 of the motor vehicle. A seat-back 104 is provided which is associated with the squab 101. A head-rest 105 is provided at the top part of the back 104, in a conventional position.

The squab 101 is associated with two support plates 106 (only one of which is shown). The support plates are mounted symmetrically on either side of the squab. Each support plate is of generally triangular form. A forwardly directed apex of each support plate 106 is pivotally connected to the squab 101 for pivoting motion about a pivot axis 107.

To co-operate with the support plate illustrated (and preferably also with the support plate which is not illustrated), a stop 108 is provided, towards the rear of the squab 101. A yieldable element 109 is provided which is located between the stop 108 and the rear part of the support plate 106. The yieldable element 109 may comprise an element formed of rubber or may comprise a compression spring. Alternatively, the yieldable element may comprise a permanently deformable element, such as a thin-walled cylinder made of metal.

As will become clear from the following description, the yieldable element provides an energy-absorbing function.

The illustrated support plate 106 (and preferably also the support plate which is not illustrated) carries two stop elements 110,111 which are located respectively in front of and behind a seat back support strut 112. The lower end of the support strut 112 is pivotally connected to the support plate 106 for pivoting movement about a pivot axis 113. The seat-back support strut 112 is securely fastened to or forms part of the framework of the back 104 of the seat. Thus, the entire back of the seat is effectively supported by or on the seat back support strut 112 and can pivot about the pivot axis 113.

A spring 114 is provided, one end of which is connected to the seat-back support strut 112, the other end of which is connected to the support plate 106. The spring resists rearward pivoting motion of the back of the seat, but with a relatively low resistive force. The spring may be replaced by a resilient element, such as a rubber belt.

In the illustrated embodiment, the head-rest 105 is provided with at least one support arm 115. Two support arms may be provided located on either side of the head-rest. One support arm 115 is illustrated. The support arm is pivotally connected, by a pivot 116 to the back of the seat 104. In the illustrated embodiment, the pivot 116 connects with the upper end of the seat back support strut 112.

The support arm 115 is provided with a forwardly projecting lug 117 which carries a pivotal connection 118 to a link arm 119. The link arm 119 extends substantially parallel with the seat back support strut 112, and the lower end of the link arm 119 is pivotally connected, at pivot point 120, to the support plate 106.

It is to be appreciated that the seat will initially have the condition illustrated in FIG. 1. The spring 114 serves to impart a forward bias or rotation to the seat back support strut 112 about the pivot axis 113, thus bringing the seat back support strut 112 into engagement with the forward stop 110 carried by the support plate 106.

In the event that a rear impact arises, whilst the seat is occupied, initially a forward acceleration is imparted to the squab 104 of the seat through the support 102. The person occupying the seat will, however, have inertia. As the squab of the seat moves forwardly, so the torso of the occupant of the seat will apply force to the back of the seat tending to cause the back of the seat initially to pivot rearwardly about the pivot axis 113. The back of the seat moves pivotally against the relatively low resisting force provided by the spring 114. Thus the back of the seat pivots in a rearward sense, against a restraining force provided by the spring 114. As can be seen from FIG. 4, the back of the seat moves to a position in which the seat back support strut engages the rear stop 111. The back of the seat thus effects a first rearward movement.

Figure 4:
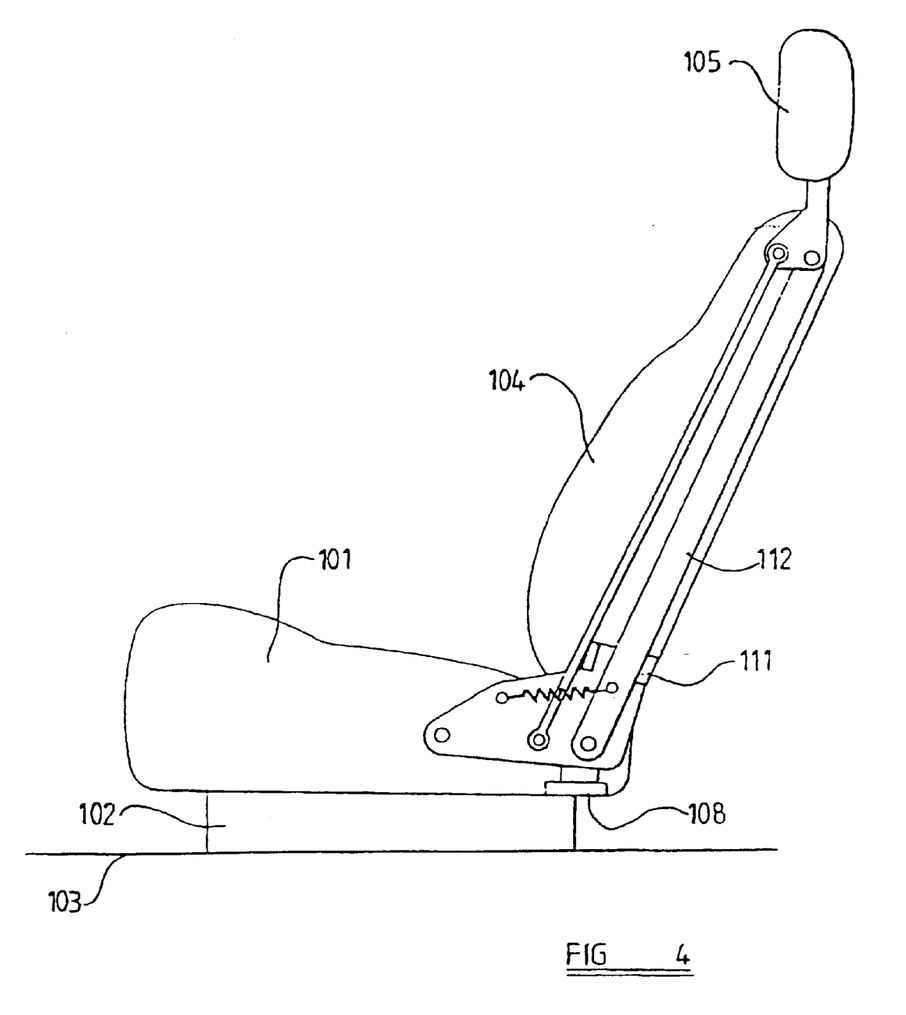
FIG. 4 is a view corresponding to FIG. 3 illustrating the seat in a second condition.

During this first rearward movement the effect of the link arm is such that the head-rest 105 pivots forwardly relative to the back of the seat about the axis defined by the pivot 116. Thus, the head-rest 105 effectively moves towards the head of the occupant of the seat, minimising the rearward distance that the head of the occupant of the seat travels before it engages the head-rest.

Since further rearward pivoting motion of the back of the seat 104 about the pivot axis 113 is prevented, as a consequence of engagement of the seat back support strut and the rear stop 111 carried by the support plate 116, subsequently, the back of the seat 104 pivots, together with the support plate 116, about the pivot axis 107, thus causing the yieldable element 109 to yield. The yieldable element 109 provides a relatively high resisting force which resists this second movement of the back of the seat. The seat is thus moved to the condition illustrated in FIG. 5.

Figure 5:
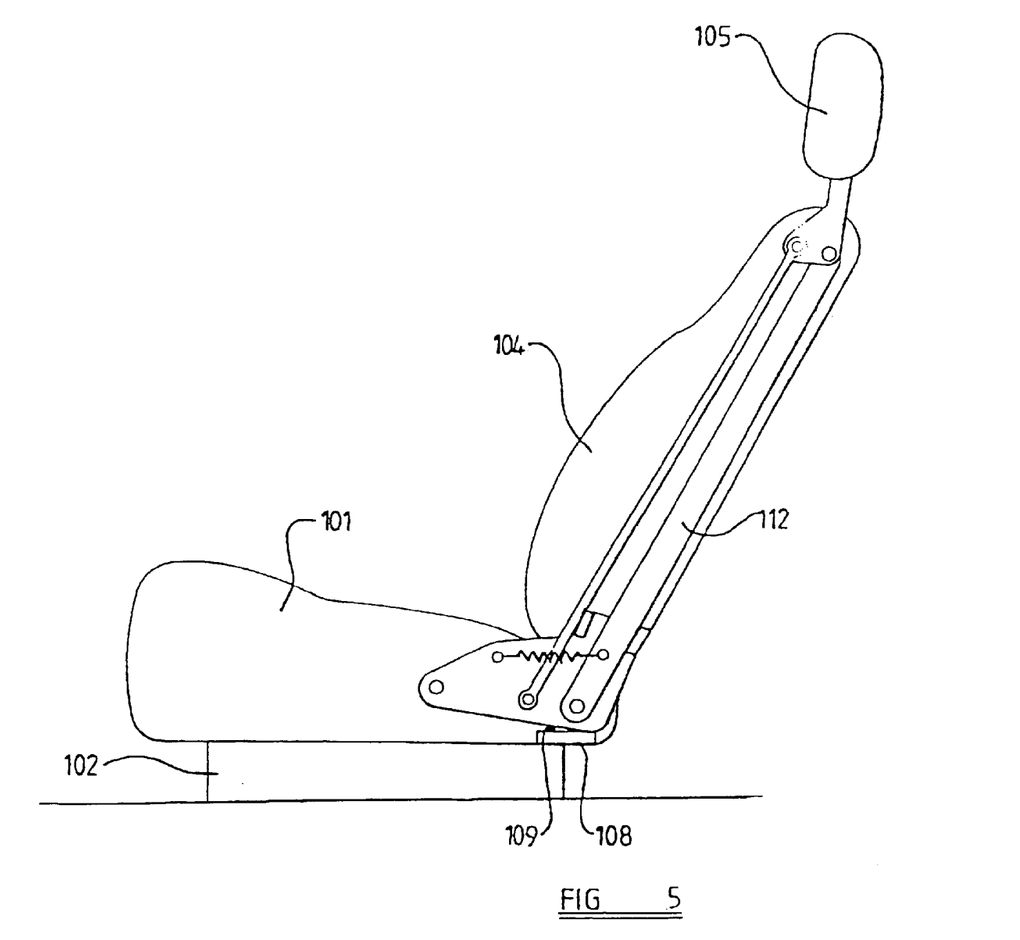
FIG. 5 is a view corresponding to FIG. 3 and illustrating the seat in a further condition.

It is to be appreciated that during this second movement of the back of the seat, because the movement is effected by a pivoting movement of the support plate about the pivot axis 107, there is no relative movement 106 between the seat back support strut 112 and the link arm 119, meaning that during this second phase of movement of the back of the seat, there is no forward movement of the head-rest 105 relative to the back of the seat.

It will be understood that the back of the seat, in a rear impact situation, executes two movements, namely a first movement against a relatively low resisting force and a second movement against a greater resisting force.

Figure 6:
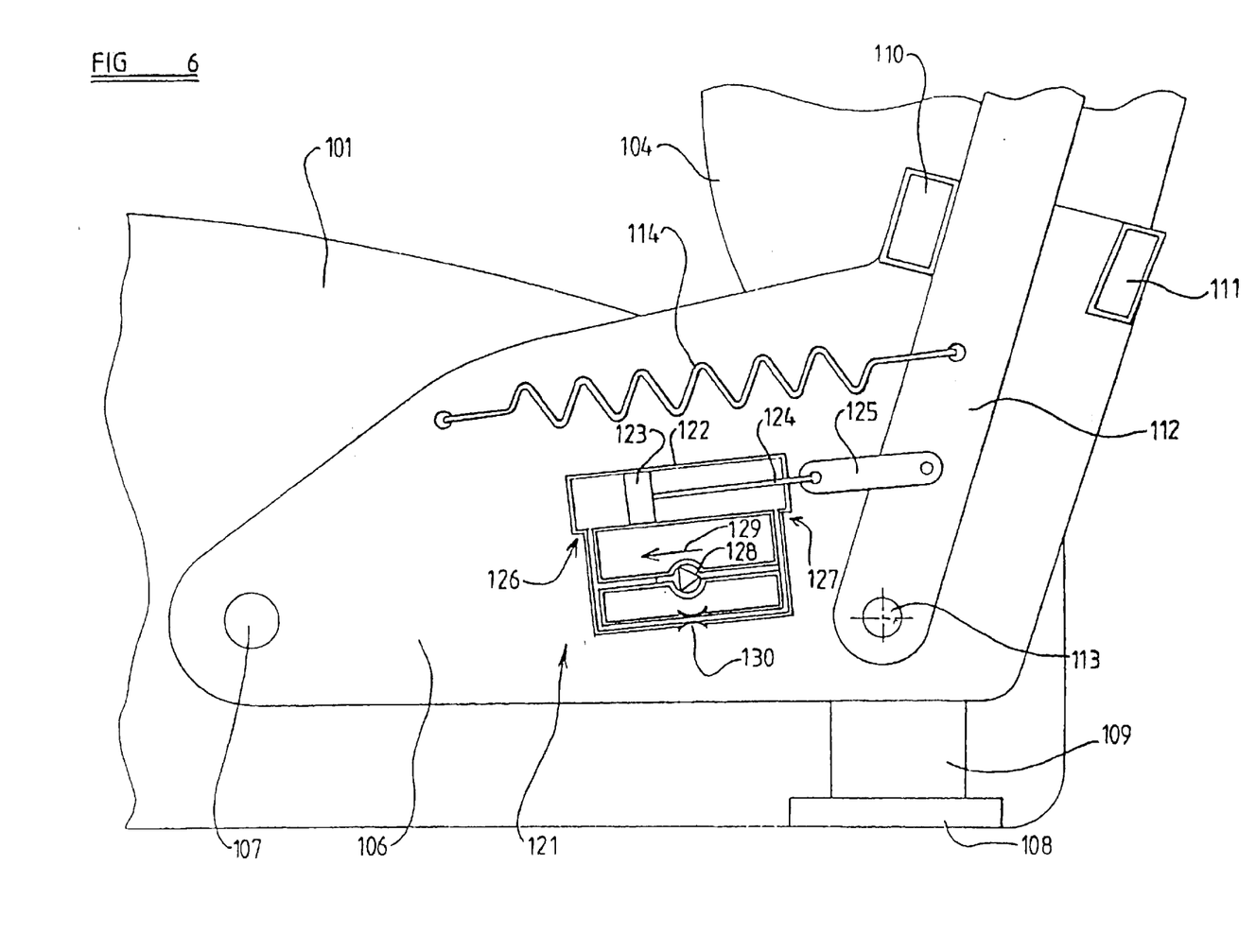
FIG. 6 is an enlarged view of part of the seat shown in FIG. 3.

FIG. 6 illustrates a component present on the seat which has not been previously described. FIG. 6 illustrates the support plate 106, the pivot 107 and the lower part of the seat back support strut 112. The link arm 119 and the pivot 120 have been omitted for the sake of clarity of illustration.

The component illustrated in FIG. 6 comprises a motion restricting device 121 which permits movement of the back of the seat rearwardly in a pivoting motion about the pivot axis 113, but which restricts any subsequent tendency for the back of the seat to move forwardly with a pivotal motion about the pivot axis 113. It is to be understood that it is desired for the torso and head of the occupant of the vehicle to be accelerated, during a rear impact, to have a forward motion which is equivalent to the forward motion of the vehicle, in as smooth and uninterrupted manner as possible. Thus, as the back of the seat executes, the first movement and the second movement described above, the torso and the head of the occupant of the vehicle are being accelerated in a rearward sense. It is to be understood that if the back of the seat should show any tendency of "bouncing" when the seat back support strut 112 engages the rearward stop 111 carried by the support plate 106, the occupant of the vehicle would be given a very substantial forward acceleration, which would be undesirable, since it would increase the role of "whiplash" injuries arising.

Thus, as can be seen in FIG. 6, a motion restricting device 121 is provided. The motion restricting device comprises a hydraulic cylinder 122 which is connected to the support plate 106. Contained within the cylinder 122 is a piston 123 which is connected by a piston rod 124 to a pivoting link 125 which is connected to the seat back support strut 112.

The hydraulic cylinder 122 is provided with two inlet/outlet ports 126,127 provided respectively at the opposed ends of the cylinder, the inlet/outlet ports 126,127 being inter-connected by a parallel connection comprising firstly a non-return valve 128 which is adapted to permit a free flow of fluid in the direction indicated by the arrow 129 and secondly a constriction or throttle 130.

It will be understood, from considering FIG. 6, that as the seat back 104 moves rearwardly with the first movement in which the seat back support strut 112 moves pivotally about the pivot axis 113, the spring 114 will be extended and also the piston 123 will move towards the right within the hydraulic cylinder 122. Fluid will flow through the inlet/outlet port 127, and will readily flow through the non-return valve 128 in the direction of the arrow 129, thus re-entering the hydraulic cylinder through the inlet/outlet port 126. The piston 123 will thus move relatively freely within the hydraulic cylinder, without any substantial resistance to movement of the seat back support strut 112.

However, should the seat back support strut 12 show any tendency of bouncing forwardly, after having impacted on the rear stop 111 carried by the support plate 106, the piston 123 will tend to move towards the left within the hydraulic cylinder 122. Fluid will thus leave the hydraulic cylinder through the inlet/outlet port 26. The fluid will not be able to flow through the non-return valve 128, since the non-return valve 128 will operate to prevent fluid flow in that sense. The fluid will, however, be able to flow through the throttle or constriction 130. This means, however, that the motion restricting device 121 will provide a substantial hydraulic damping to any forward movement of the back support strut 112 of the seat. Consequently, there will be severe resistance to any forward motion of the back of the seat following the above-described first motion of the back of the seat during any accident situation.

It is to be understood, however, that the seat will return to its initial condition, as illustrated in FIG. 3, after a period of time, since the force exerted by the spring 114 on the seat back support strut 112 will tend to cause the seat back 104 to pivot forwardly relatively slowly with a flow of hydraulic fluid through the throttle or constriction 130.

The first phase of movement of the back of the seat can be released by a release element activated by a sensor which responds to a rear impact. The spring 114 and the motion restricting device 121 can be replaced by a plastically deformable element. However, in this case the seat back will not return to its normal position automatically.

What is claimed is:

1. A safety seat for use in a motor vehicle, the safety seat comprising: a squab; back associated with the squab and a head-rest associated with the back; a pivotal connection between the back and the squab, the pivotal connection being such that the back will move pivotally rearwardly relative to the squab when subjected to a substantial force; and means associated with the head-rest for moving the head-rest with a movement that has an upward component and a forward component relative to the back of the seat during at least part of the rearward movement of the back of the seat.

2. A seat according to claim 1, wherein the said rearward movement occurs in two stages, the movement of the head-rest being associated with the first stage only of said two-stage movement.

3. A seat according to claim 1, further including a recliner mechanism operable to selectively adjust the inclination of the back of the seat, wherein the position of the head-rest relative to the back of the seat does not alter on actuation of the recliner mechanism.

4. A safety seat according to claim 3 wherein the means associated with the head-rest includes a linkage comprising a component which remains fixed relative to the squab of the seat when the back of the seat effects said pivotal rearward movement when subjected to said substantial force and wherein the component is associated with the recliner mechanism and is adapted to move together with the back of the seat when the recliner mechanism is actuated.

5. A seat according to claim 1, wherein the means associated with the head-rest includes a linkage comprising a component which remains fixed relative to the squab of the seat when the back of the seat effects said pivotal rearward movement when subjected to said substantial force.

6. A safety seat for use in a motor vehicle, the safety seat comprising: a squab; a back associated with the squab; a head-rest associated with the back; support means pivotally connected to the back for pivotal movement of the back relative to the support means between first and second limits, the support means being pivotally connected to the squab to permit movement of the support means and the back, relative to the squab; energy-absorbing means for absorbing energy when the support means pivots relative to the squab of the seat; and a linkage between the head-rest and the support means for causing the head-rest to pivot forwardly, relative to the back of the seat, when the back of the seat executes a pivoting motion relative to the support means and for retaining the head-rest in a substantially fixed position relative to the back seat when the support means and the back together pivot relative to the squab.

7. A seat according to claim 6, wherein the support means comprises at least one support plate provided on one side of the seat, the support plate being pivotally connected to the squab of the seat and the support plate being pivotally connected to an element associated with the back of the seat, the support plate carrying stop means adapted to engage said element to limit pivotal movement of the element relative to the support plate both forwardly and rearwardly.

8. A seat according to claim 6 further including spring means are provided connected between the support means and the back of the seat to resist rearward pivotal movement of the back of the seat relative to the support plate.

9. A seat according to claim 6, wherein the energy-absorbing means comprises a yieldable element located between the support means and a stop.

10. A seat according to claim 6, wherein when a force is applied to the seat back, the seat back executes a first movement, moving pivotally relative to the support means, against a relatively low resisting force, and executes a second subsequent movement, with the support means moving pivotally relative to the squab against a relatively high resisting force.

11. A seat according to claim 6, further comprising at least one support arm carrying the head-rest; a pivot connection pivotally mounting the support arm to the back of the seat, the support arm having projecting means projecting from the pivotal connection; and a link arm extending between the support means and the projecting means.

12. A seat according to claim 6, further comprising means which resist any tendency of the back of the seat to pivot forwardly from a rearward position with a pivoting movement relative to the support means.

13. A seat according to claim 12, wherein resisting means comprises a hydraulic damper.

* * * * *